Aug. 14, 1934. P. KRUSE 1,969,803
INTERNAL SEAM SOLDERING MACHINE
Filed Jan. 12, 1933 4 Sheets-Sheet 1

INVENTOR
Peter Kruse
BY
Fraser, Myers & Manley
ATTORNEYS.

Aug. 14, 1934.  P. KRUSE  1,969,803
INTERNAL SEAM SOLDERING MACHINE
Filed Jan. 12, 1933  4 Sheets-Sheet 3
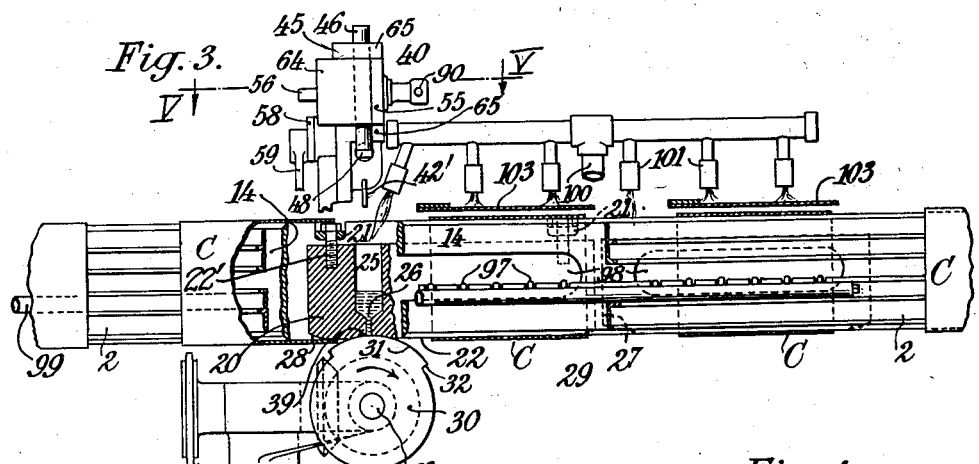
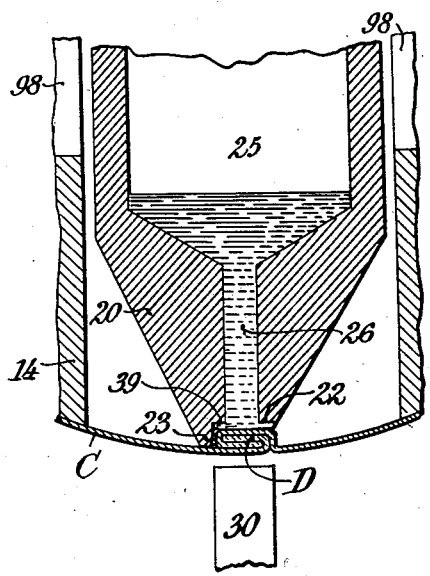
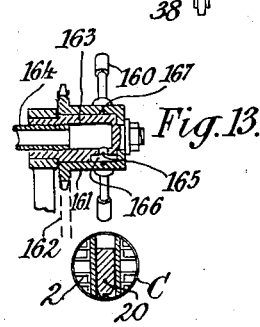
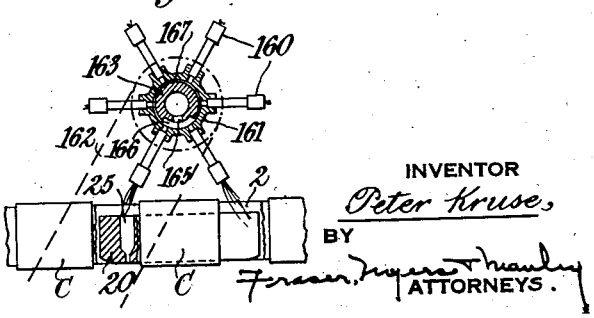
INVENTOR
Peter Kruse,
BY
ATTORNEYS.

Aug. 14, 1934.   P. KRUSE   1,969,803
INTERNAL SEAM SOLDERING MACHINE
Filed Jan. 12, 1933   4 Sheets-Sheet 4
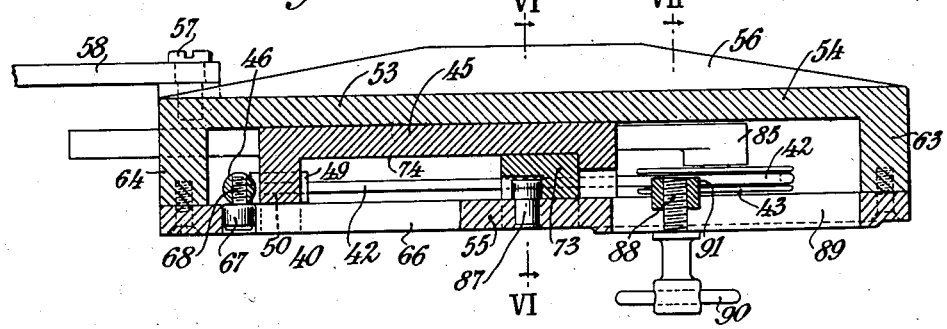
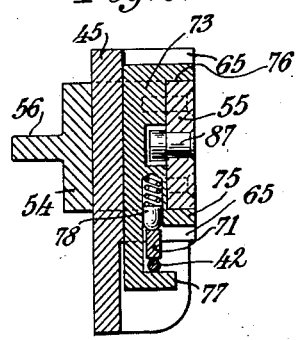
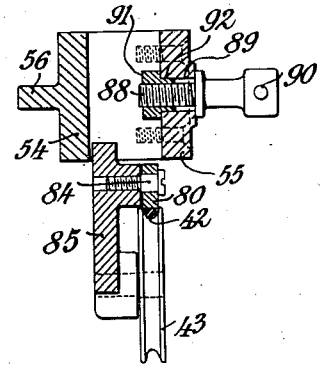
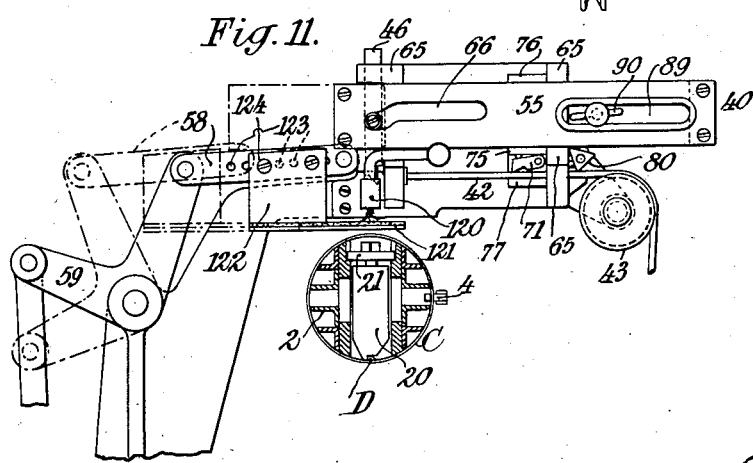
INVENTOR
*Peter Kruse*
BY
*Fraser, Myers & Manley*
ATTORNEYS.

Patented Aug. 14, 1934

1,969,803

UNITED STATES PATENT OFFICE 1,969,803

INTERNAL SEAM SOLDERING MACHINE

Peter Kruse, Brooklyn, N. Y., assignor to E. W. Bliss Company, Brooklyn, N. Y., a corporation of Delaware Application January 12, 1933, Serial No. 651,256

19 Claims. (Cl. 113—62)

This invention relates to new and useful improvements in machines for internally soldering the side seam of can bodies. In machines of this type a succession of can bodies to be soldered are fed along one or more internal soldering irons which engage the side seam on the inside of the body and apply solder thereto.

The present invention has as one of its objects to provide improved mechanism for delivering solder to an internal soldering iron in a machine of the character described.

Another object of the invention is to provide in such a machine an internal soldering iron having associated therewith a solder well and valve means to control the flow of solder from said well to the active surface of the iron.

A further object of the invention is to provide means for automatically regulating the delivery of solder to, and the outflow from, the aforesaid solder well whereby the active surface of the iron will receive appropriate amount of solder at the time that such solder is required, the flow of solder to such surface being automatically cut off during the intervals between the engagement of the soldering iron with the can bodies that are successively fed therealong.

The invention further aims to provide means for applying heat to the internal soldering iron during the intervals between the passage of successive can bodies, the heating effect during the passage of each can body being automatically interrupted or reduced in intensity so that any danger of applying excessive heat to the body is eliminated and economy of heat is effected.

A still further object of the invention is to provide in a machine of the character described a soldering iron having a working face of special form whereby to achieve an improved application of heat to the seam which is to be soldered, so that the solder is more uniformly distributed and caused to occupy those portions of the seam where it is most effective.

Further objects of the invention will be apparent from the following more detailed description, it which reference is had to the accompanying drawings, and wherein Figure 1 is a general plan view of a soldering machine according to the present invention, the machine being connected to a can body maker in the usual manner.

Fig. 3 is a similarly enlarged fragmentary side elevation of the machine shown in Fig. 1, certain portions being broken away to show details of the internal solder applying mechanism appearing in Fig. 2.

Fig. 4 is an enlargement corresponding in section to Fig. 2, and shows details of the solder applying element appearing in the latter figure.

Fig. 5 is a horizontal sectional detail of the solder cutting mechanism shown in Fig. 3, the section being taken along the line V—V.

Figs. 6 and 7 are vertical sections taken respectively along the lines VI—VI and VII—VII of Fig. 5, as viewed in the direction of the arrows.

Fig. 8 is a side elevation and partial section showing details of a modification in the solder valve and heat control mechanism of Figs. 1–7.

Fig. 9 is a vertical transverse section taken along the line IX—IX of Fig. 8.

Fig. 10 is a plan view of a further modification of the heat control wherein a baffle disk is substituted for the chain mounted baffles of the first embodiment.

Fig. 11 is a plan view of another modification wherein a reciprocating baffle is substituted for the disk baffle of Fig. 10.

Fig. 12 is a vertical longitudinal section showing details of a further modification wherein a movable burner is substituted for the fixed burners of the foregoing constructions.

Fig. 13 is a vertical transverse section taken along the line XIII—XIII of Fig. 12.

Figure 1:
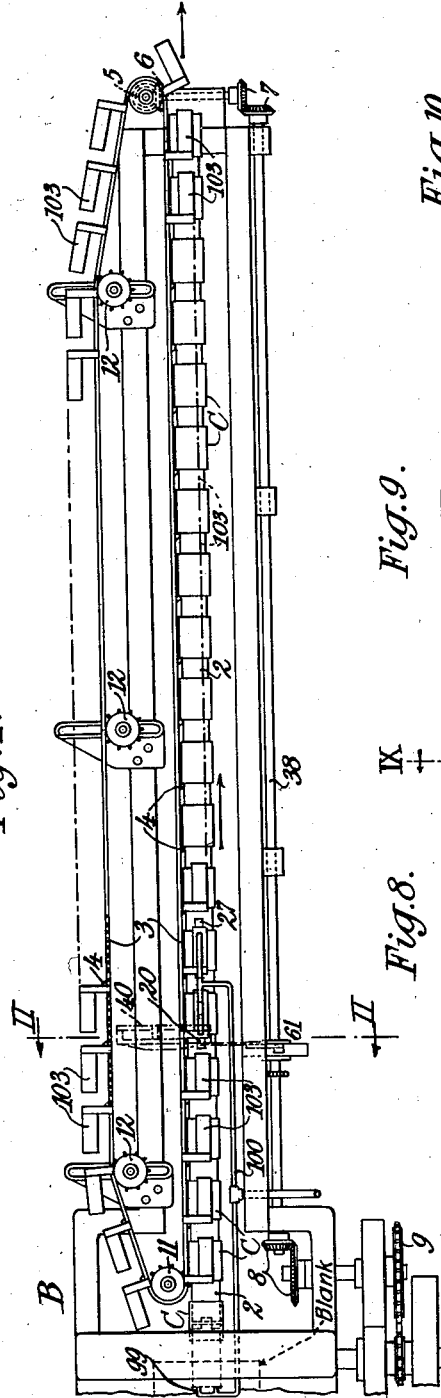

In making can bodies with the conventional soldered side seam, the soldering operation is generally performed externally. This necessarily involves the application of considerable heat and the engagement of the soldering tools with the external surface of the body adjacent to the side seam. If lithographed or decorated bodies are to be soldered, it is necessary to leave a certain blank or undecorated portion in the neighborhood of the seam in order to avoid the marring of the ornamentation that would otherwise result from the soldering operation in the neighborhood of the seam. This expedient generally impairs the attractiveness of the decorated body, and a considerable demand has therefore developed for internally soldered bodies which permit of carrying the exterior lithographic decoration right up to the edges of the seam so that the decoration is uninterrupted.

The apparatus according to the present invention is particularly designed for internally soldering the side seams of can bodies automatically and at a high production rate. While various machines have been hitherto devised for a like purpose, the present invention presents various features of novelty which contribute to the improved performance of the apparatus, both from the standpoint of reliability and rapid production.

As seen in the general plan view (Fig. 1) the automatic soldering mechanism according to the present invention is adapted to be connected in the conventional manner to a body making machine, the delivery end of which appears at B. The can bodies C are delivered from the body maker onto an elongated horn or support 2 which extends throughout the length of the soldering machine, the bodies being propelled along the said support by a feed chain 3. This chain is of the conventional type having regularly spaced feed fingers or dogs 4 which engage the ends of the can bodies as they are delivered from the body maker and advance said bodies in regularly spaced relationship. The chain is driven by sprocket 5, which, through bevel gearing 6, 7, 8, and chain drive 9, receives power from the main drive 10 of the body making machine B. In this manner the feed chain is synchronized with the body maker so that after each body is formed, one of the chain dogs 4 arrives in position to operatively engage the rear end of the body as the latter is ejected from the machine B. The driving sprocket 5 and a similar idler sprocket 11 toward the opposite end of the support maintain the feed chain in close alignment with the said support and in such position that the feed dogs 4 extend somewhat within the outline of the can bodies. Adjustable idler sprockets 12 are provided to maintain the desired tension on the feed chain.

The elongated support or horn 2 is of usual construction. It may consist of central supporting plates 14, as seen for example in Figs. 2, 3 and 9, to which are secured a plurality of ribs 15, the outer edges of which afford lines of support corresponding closely with the internal contour of the can bodies although affording sufficient clearance to permit the bodies to slide freely therealong. The receiving end of the horn 2 is directly connected to the horn 16 of the body maker and in effect constitutes an extension thereof. The opposite end of the horn 2 may be supported in any suitable manner, preferably by some form of traveling support which engages the horn from below and in the gaps between successive can bodies, the points of support traveling at the same linear speed as the bodies so as to avoid contact therewith. A suitable traveling support of this character is disclosed in my Patent No. 1,333,550, granted March 9, 1920. Various supports of this character are well known in the art and need not be described in further detail. (See, for example, Patent No. 1,317,929, granted to Lokan, October 7, 1919).

The can bodies are delivered from the body maker B with the edges of the side seam securely interlocked, the position and character of the seam being indicated at D in the enlarged cross-section of Fig. 4. In this condition the seam is ready to be soldered, the interlocked edges having been previously fluxed. Various methods of applying flux to the seam edges are well understood, and accordingly they need not here be described in detail. The sheets are sometimes delivered to the body maker with their edges already fluxed although the usual practice is to provide fluxing pads or rolls which engage the edges of the sheet as the latter advances through the body maker prior to its being formed into a tubular body.

The specific structures thus far described are all in accordance with conventional and well understood practice and are cited as illustrative of forms of mechanism to which the present invention is applicable. The body maker, soldering horn, horn support, body feed and seam fluxing mechanisms may be of any desired type, the present invention not being limited to any specific form of these mechanisms, the many variations of which are commonly known in the art.

Figure 2:
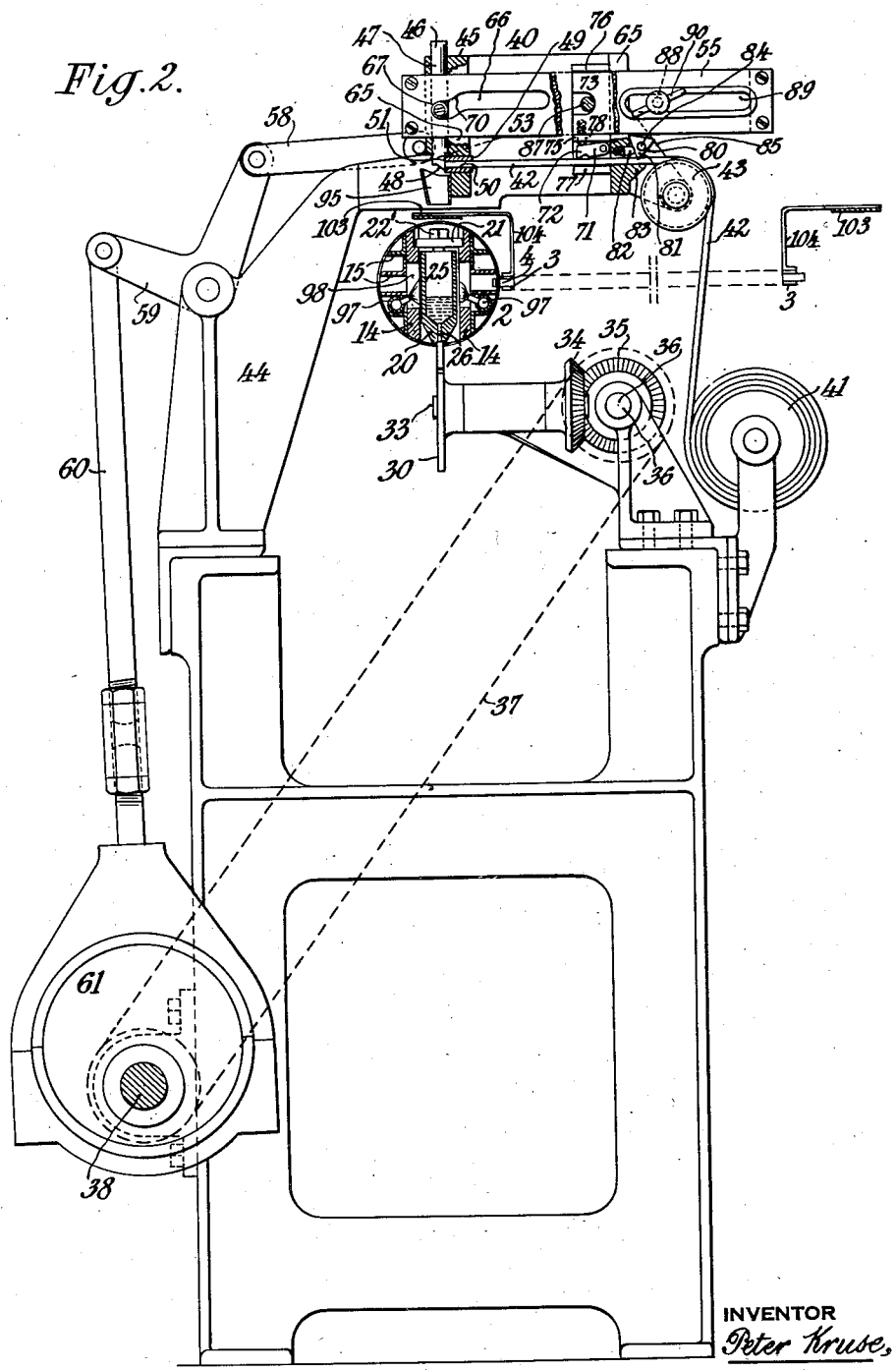
Fig. 2 is an enlarged transverse vertical section taken along the line II—II of Fig. 1.

According to the present invention the internal solder-applying element, as best seen in Figs. 2, 3 and 4, consists of an elongated metallic body 20 mounted between the vertical walls of plates 14 which constitute the central reinforcement for the horn 2 along which the bodies are fed. This solder-applying element or "iron", as it is commonly termed regardless of its metallic composition (the "iron" being frequently made of copper), is suspended from small transverse bridge pieces 21 upon screws 22' which slide freely through openings in the said pieces, the heads of said screws limiting the downward movement of the solder-applying element. The sides of the said element slope inwardly toward the bottom, as seen in Fig. 4, so that the flat under surface 22 adjacent the seam is but little wider than the seam itself. A downwardly-projecting longitudinal fin 23, formed integrally with element 20, extends below the surface 22 by approximately the thickness of the inward projection of the seam D. This fin closely parallels the side of the seam and acts to convey molten solder along and into the open side of the seam. It will be apparent that solder can only enter the convolutions of the interlocked seam from the left hand side as viewed in Fig. 4, and that any solder flowing to the right from the upper exposed surface of the seam would be wasted. This is largely prevented by the design of surface 22 and fin 23, which, when maintained at suitable soldering temperature, effectively heat the seam and convey the solder to the open side thereof where it rapidly penetrates between the interlocked surfaces of the seam.

The solder-applying element 20 has formed within it a solder well 25 from which a duct or passage 26 conveys molten solder to the surface 22 and fin 23, the solder thence flowing into the seam and being uniformly distributed therealong as the can body C is advanced. The length of the said solder-applying element 20 is such that the body seam is subjected to its action for a sufficient period to insure adequate penetration of the solder within the seam. If desired, additional heated irons, which may be generally similar to the solder-applying element 20, may be provided along the horn in order to maintain the seams of the advancing bodies at proper soldering temperature for whatever period may be required to insure the sweating of the solder into the most remote interengaged surfaces of the seam. An additional iron of this character is seen at 27 in Figs. 1 and 3. Ordinarily such additional irons would not be provided with solder wells inasmuch as the solder-applying function is adequately performed by the element 22, as above described.

It will be understood that the solder-applying element 22 and the additional sweating iron 27 are held by gravity in working relationship with the internal body seam and thus freely accommodate themselves to any small variations in the body contours. The end of the element 20, which first engages the advancing body, is somewhat rounded, as seen at 28 (Fig. 3) to insure that the element will ride up over the entering edge of the body. The end of iron 27 is rounded at 29 for a like purpose.

In order to prevent the flow of solder from well 25 during the intervals in which no can body is in position to receive solder therefrom, there is provided a valve 30 which is synchronized with the movement of the body feed chain so that the valve automatically closes the solder port 26 as soon as one body moves beyond the port, the said valve maintaining the port closed until the succeeding body comes into position to receive solder therefrom. The valve 30 may be of any suitable form. In the embodiment shown in Figs. 2 and 3, the movable valve element consists of a continuously rotating disk, a segment of the periphery of which periodically engages the lower surface of solder-applying element 20 in such manner as to close the solder port 26. The circular arc of segment 31 is concentric with the axis of the disk and is disposed at such radius that the segment exerts a slight camming action tending to lift the element 20 just sufficiently to insure that the weight of said element is effective to maintain the solder port 26 seated against the working surface of sector 31. The angular width of sector 31 is related to the remaining or idle angle of the disk substantially in the ratio of the length of the gap between successive can bodies, to the length of said bodies; and the valve disk 30 is timed to make one complete revolution while the feed chain 3 advances a distance represented by the length of one can body plus the length of the gap between successive bodies, i. e., the distance separating the successive feed fingers 4 along the feed chain. The radius of the valve sector 31 is preferably such that the peripheral speed of the latter is substantially equal to the linear speed of the advancing bodies, although this particular relationship is not essential. If the peripheral speed is somewhat greater, the radially disposed end surface 32 of valve sector 31 will advance beyond port 26 faster than the can-body movement induced by the feed chain, and will therefore engage the rear of the departing body and for a brief interval accelerate its movement until surface 32 swings below the line of the body. This condition is not objectionable but is unnecessary, and by suitably proportioning the radius of valve sector 31 the working surface thereof will enter between the can bodies and effect the closing of port 26 during the interval between successive bodies without exerting any driving effort upon the departing body and without being engaged by the next advancing body.

The valve disk 30, as seen in Figs. 1, 2 and 3, is mounted on a transverse shaft 33, said shaft receiving power through bevel gearing 34, 35, shaft 36 and chain drive 37, which is driven by the main shaft 38. The said main shaft is connected at one end through bevel gearing 8 and chain drive 9 with the shaft 10 of the body-making machine B, and at its opposite end through bevel gearing 7 with the driving sprocket 5 of the body feed chain 3, as hereinbefore described. In this manner the movement of the rotary valve 30 is synchronized with the advance of the said feed chain so as to perform its valve function in accurately timed relationship with respect to the advance of the can bodies.

It will be noted that the lower surface 22 of the solder-applying element is slightly rounded adjacent the solder port 26 to provide an arcuate seat 39 (Figs. 3 and 4) which accurately conforms with the cylindrical contour of the working surface of valve sector 31. This not only provides an enlarged area of contact which insures the effective closing of the port and increased life of the working surfaces of the valve, but provides a slight gap between the port opening and the body seam when the latter is in position to receive solder therefrom. The presence of said gap resulting from the slight elevation of the port opening above the working surface 22 of the solder-applying element insures the free flow of solder to the seam. If the opening of port 26 were not thus slightly elevated above the plane of surface 22 the engagement of the body seam with said port might too greatly reduce the flow of solder therefrom so that an adequate supply would not be received within the seam. The weight of the solder-applying element holds the surface 22 thereof yieldingly in contact with the upper surface of the seam, the surface 22 thus in effect guiding the element 20, the opening of the solder port 26 being maintained at a substantially uniform distance from the seam regardless of variations in the contour of the can bodies. Thus, in addition to the function of supplying heat to the body seam, the surface 22 may be said to constitute gauging or guiding means for maintaining the desired slight separation between the opening of solder port 26 and the seam. The elevation of the solder port above the surface 22 need be but a few thousandths of an inch, the size of the gap being determined by the character of solder employed, the temperature of the solder-applying element, and by the size and character of the seam which is to be soldered. If the element 20 is sufficiently heated to maintain the solder in a highly fluid state and little solder is required by the seam, no gap will be required between the port and the seam, but ordinarily there is a distinct advantage in providing the slight gap as above described.

In order to supply solder to the solder well 25 within the line of advancing bodies, a special solder-feeding mechanism 40 is provided. This preferably comprises a chopper which, in timed relationship with the advance of the can bodies, severs uniform lengths of solder from a solder strip fed thereto and delivers such lengths or slugs of solder to the solder well 25 during the intervals between the passage of successive can bodies over the said well.

As seen in Fig. 2, a reel 41 of solder strip or wire is mounted at a convenient point on the frame of the machine, the strip 42 passing over a pulley 43 and thence into the chopper 40. The chopper is mounted upon a suitable bracket 44 which is secured to the frame of the machine. A stationary head 45 formed at the upper end of bracket 44 provides the mounting for the movable elements of the chopper. In this head a reciprocating chopper rod 46 is vertically guided in a bore 47. The lower end of rod 46 is sharpened to provide a cutter or shearing edge 48 which bears closely against the end of a hardened bushing 49 rigidly mounted in head 45. Through this bushing the solder strip 42 is fed by means hereinafter to be described, the bore 50 in said bushing being sufficiently large to permit the free feeding of the solder strip therethrough but affording an effective support for the strip so that the projecting end thereof is readily sheared off by cutter or chopper 48. The engagement of the flat face 51 at the lower end of chopper rod 46 with the end of bushing 49 prevents the rod from rotating. If desired, the rod 46 may be of square cross-section and guided within a squared guideway. The chopper is actuated by a horizontal slide 53, which, in its reciprocating motion also effects the feed of the solder strip. The slide 53 consists of parallel plate-like members 54, 55, the rear plate 54 being reinforced by a longitudinal fin 56 (Figs. 5, 6 and 7). Reciprocating motion is imparted to the slide by a link 58, the latter being connected through bellcrank 59 and connecting rod 60 with an eccentric 61 rigidly secured upon the drive shaft 38 through which the various related mechanisms are driven, as hereinbefore described.

Completing the description of the slide and its mounting, it will be noted that plate 55 is rigidly connected to end members 63, 64, formed on back-plate 54, the said plates slidably embracing the stationary head 45. As seen in Figs. 2 and 3, forwardly-extending portions 65 of head 45 slidably engage the upper and lower edges of plate 55 so as to afford a horizontal guideway therefor.

A cam slot 66 formed in the front plate 55 of slide 53 receives a cam roller 67 mounted upon a stud 68 secured to the vertically slidable chopper-rod 46. The cam slot, toward its left end, is inclined, as shown at 70 (Fig. 2), so that as the slide is moved toward its extreme right hand position the roller 67 will be thrust downwardly, thus causing the chopper-rod 46 to shear off the projecting end of the solder strip. Upon the return stroke the movement of the chopper-rod is reversed. The cam slot 66 extending horizontally to the right beyond the inclined portion 70 holds the chopper-rod in its upper or idle position until the slide is again returned to a point where the roller 67 is engaged by the cam incline 70.

The solder strip is advanced a predetermined distance during each movement of the slide 53 toward the left by means of a feed finger 71. This finger is provided with a sharpened end 72 and is pivoted at its opposite end upon a block 73 which is slidably guided between the face 74 of stationary head 45 and the front plate 55 of the horizontal slide 54 hereinbefore described. This independently slidable block 73 has forwardly projecting ears 75, 76, which engage the upper and lower edges of the front slide plate 55 and thus guide the slide-block 73 therealong. A corresponding forwardly projecting ear 77 formed at the lower end of block 73 provides a support for the solder strip 42, and during the movement of the slide to the left the strip is gripped between the ear 77 and feed finger 71, which is pivoted on the same block. During this feeding operation the sharpened nose of the feed finger is caused to dig into the solder strip by the action of a spring-pressed plunger 78 which bears against the upper surface of the said finger (Figs. 2 and 6). It will be noted that the shape of the sharpened edge 72 is such that it automatically disengages itself from the solder strip when moved toward the right relatively thereto, the surface to the right of the sharpened edge sloping on a gentle incline so that when moved toward the right it tends to lift the feed finger and permit it to slide with but little friction along the solder strip. To prevent any frictional drag of the feed finger and slide-block 73 from moving the strip toward the right, a detent 80 is provided. This acts very similarly to feed finger 71, the detent having a sharpened edge 81, which, under the action of spring-pressed plunger 82, is caused to dig into the solder strip and hold it against shoulder 83 projecting from the end wall of the stationary head 45 (as seen in Figs. 2 and 7).

The detent 80 is pivoted upon a stud 84 secured to a bracket 85. The bracket constituting a part of the stationary head 40 also supports the pulley 43 which guides the solder strip and maintains it in alignment with the said detent. When the feed finger and slide-block 71, 73, advances the solder strip 42 toward the left, the detent 80 swings clockwise about its pivot and permits the free movement of the strip. Upon cessation of this advancing movement the detent being yieldingly held in contact with the strip by spring plunger 82, tends to dig into the strip in such manner as to prevent any appreciable movement toward the right, and any drag which may be exerted by the feed finger 71 in its return movement merely causes the strip to be more securely wedged beneath the sharpened edge 81 of said detent, as will be readily understood. The solder strip being relatively soft, is indented by both the feed finger 71 and detent 80 so as to virtually form ratchet teeth in the strip, the feed finger and detent acting respectively on such indentations as would the conventional feed and stop pawls used in ratchet mechanisms.

It will be apparent that if the stroke of feed slide 54 were adjusted to effect precisely the required advance of the solder strip during each reciprocation, there would be no necessity for any relative movement between the slide-block 73 and the slide 54. Because the machine is designed to solder can bodies of various types, it is desirable to provide for adjusting the rate of solder delivery to the solder well 25, and this is conveniently accomplished by providing an adjustable lost motion driving connection between the reciprocating actuating slide 54 and the independent slide-block 73 which carries the solder feed finger 71. This is accomplished by mounting driving pins in the front plate 55 of slide 54. These pins are spaced apart and project inwardly so as to operatively engage the slide-block 73. The pin 87 is permanently secured near the middle of slide-plate 55, and when the slide moves toward the right, engages the slide-block 73 and carries it to the extreme right hand position, as seen in Figs. 2 and 5. The driving pin 88 is adjustably secured within a horizontal slot 89 formed toward the right hand end of slide-plate 55. The pin 88 is formed as a hand screw, the head of which bearing against the outer surface of plate 55 is provided with a cross-piece 90 to permit manual operation of the screw. The inner end of the screw is threaded into a nut 91 (Figs. 5 and 7) having a squared shoulder 92 which fits within slot 89 and is thus prevented from rotating. It will be seen that upon a predetermined movement of the driving slide 54 toward the left (Figs. 2 and 5) the nut 91 will engage slide-block 73 and move the latter, together with its feed finger 71, toward the left during the remainder of the stroke of the driving slide. By adjusting the position of the nut 91 along slot 89 in the driving slide, the travel of the block 73 can be regulated so that on its feeding movement the solder strip 42 will be advanced to feed any desired length of the strip to the reciprocating chopper 46. If the nut is secured at the left end of slot 89, the slide-block 73 will partake of the movement of driving slide 54 throughout practically the entire stroke, whereas if the nut is secured at the right hand end of the slot, the driving slide will practically complete its stroke before the block 73 is engaged by the nut, so that but a very short length of solder strip will be fed.

It will be noted that the above-described solder feeding mechanism is disposed above the solder horn 2 in such position that the severed lengths of solder 42' are dropped directly into the solder well 25, the mechanism being preferably so timed that a piece of solder drops into the well through the gap between each of the successively advancing can bodies. A chute 95 immediately below the chopper 47, 48, serves to direct the several pieces of solder to the well 25. The operator of the machine may readily ascertain the rate at which solder is drawn from the well 25 and he will accordingly adjust the stroke of the feed finger 71 by suitably positioning screw 88, as hereinbefore described, so that the amount of solder consumed in soldering each seam is again supplied to the well after the departure of one can body and before the arrival of the succeeding body. This adjustment once having been made for any given run of bodies, will require but little, if any, attention.

There remains to be described the means for maintaining the internal solder-applying element 20 and any additional sweating irons 27 at suitable working temperatures. Because of the limited space within the soldering horn, it is difficult to arrange burners within such horn which will maintain the soldering elements or irons at the required temperature. Very compact electrical heating units may be employed for this purpose, but such units are expensive to operate and maintain. Accordingly I have provided a line of internally-disposed gas burners within the solder horn on each side of the solder-applying and sweating elements, and the heating effect of these internally-disposed burners is supplemented by external burners which direct heat to the said elements through the gaps between the successive can bodies. The internally arranged burners 97 direct their flame against the sides of the soldering elements through openings 98 in the frame plates 14 of the horn (Figs. 2 and 3). These burners are fed by pipes 99 which extend toward the left within the horn and are brought out at the open end thereof where they are connected to the supply pipe 100, as seen in Fig. 1. It will be understood that the extension of the feed pipe to the interior of the horn at its left hand end does not interfere with the advance of the sheets from which the bodies are formed, the said sheets being wrapped around the cylindrical horn of the body maker after they have advanced to a position beyond the point where the gas feed enters the horn, in accordance with well understood practice.

A line of external burners 101 is mounted directly above the solder horn, the flame from such burners being directed onto the internal solder-applying element 20 and sweating iron 27 through the space between the skeleton frame members of the horn. In order to prevent the flame from damaging the exterior of decorated can bodies, there are provided a series of baffle plates 103 supported on bracket arms 104 carried by the links of the feed chain 3. These baffle plates are of substantially the same length as the can bodies and are disposed at the same intervals along the feed chain in such manner as to afford a shield which travels with each body and protects it against the action of the burners 101 as each body passes thereunder. In the gaps between the successive shields the flame from said burners has unobstructed access to the soldering elements 20, 27, within the horn.

A modification of the movable protective shield corresponding to the baffle plates 103 carried by feed chain 3 as above described is seen in Fig. 10, wherein a fragment of the solder horn appears at 2, the can bodies C being advanced therealong by the usual feed chain (not shown). Two burners 110 direct their flame downwardly against the internal solder-applying element 20. A four-winged disk 111 mounted on a vertical shaft 112 revolves at such speed that the wings 113 rotate successively beneath the burners 110 and intercept the flame therefrom during the period required for the can bodies to pass beneath and out of the direct range of the burners. The gaps between the wings of the protective disk permit free access of the flame to the internal soldering elements through the gaps between successive can bodies. The disk 113 may be synchronized with the advance of the body feed through bevel gearing 115 which is driven directly through a chain drive 116 from the main drive shaft 38, which, as hereinbefore set forth, controls the movement of the feed chain and other related mechanisms.

A further modification by which the advancing can bodies are protected from the action of an external burner is shown in Fig. 11. In this construction the flame from burner 120 is intercepted by a transversely reciprocating baffle plate 121. This plate is carried upon a bracket 122 which is rigidly secured to the horizontal reciprocating link 58 which actuates the solder feeding mechanism, as hereinbefore described. The movement of this link being timed in accordance with the advance of the can bodies, it will be apparent that the baffle plate 121 will be projected beneath the burner 120 upon the arrival of a can body therebeneath, and if the length of the baffle plate is suitably proportioned it will continue to intercept the flame during the reciprocating movement of link 58 for the period required by the can body to be moved beyond the burner, the baffle plate then moving away from said burner to permit the flame to act upon the internal soldering element 20 in the gap between the advancing bodies. In order to regulate the period during which the flame will be intercepted by the baffle plate 121, said plate may be adjustably secured to the actuating link 58 as by means of a plurality of adjusting holes 123. By this means the plate may be attached to the link by screws 124 in various positions, the positions further to the right causing the plate 121 to remain beneath the burner for a longer period during the reciprocation of the link than those to the left. By such adjustment the baffle plate may be set to afford protection for can bodies of various lengths, the longer can body obviously requiring the flame to be intercepted for a longer period.

In Figs. 8 and 9 there is shown a further modification wherein the can bodies are protected from the action of the external burners 130 by means of a timing valve 131 which automatically reduces the flame of said burners as a body passes therebeneath, the flame again being restored to normal so as to heat the internal soldering element 20 during the interval between successive can bodies. The individual pipes 132 supplying gas to the three burners 130 communicate with three equally spaced chambers 133 within a valve housing 134. A hollow rotary valve head 135 within said housing receives gas from a central supply pipe 136. Gas entering the interior of the rotary head is distributed to the individual chambers 133 through a main supply port 137 and auxiliary ports 138. The latter are of very small diameter such as to deliver to the burner pipes 132 only a sufficient flow of gas to maintain a small pilot flame. The main supply port 137 is sufficiently large to afford the required gas supply for the maximum working flame. Individual gas cocks 139 are preferably provided in each of the burner pipes 132 to regulate the size of the working flame. As the valve head 135 revolves, the main port 137 will be brought into successive communication with the valve chambers 133, thereby progressively establishing the full working flame at the burners. This flame will continue to burn for an interval corresponding to the time required for the passage of the gap between successive can bodies and will thereupon be reduced during the transit of a body under the respective burners, the said burners at such time receiving only the limited supply resulting from the communication of the small auxiliary ports 138 with their respective valve chambers. The rotary valve head 135 extends through the left hand end of valve casing 134 (Fig 8) and is connected to a shaft 140 which receives power through chain drive 141 from the main driving shaft 38 hereinbefore described, so that the gas distributing valve is synchronized with the body feed. It will be seen that the action of the above described valve mechaninsm in effect produces a progression of flame from one burner to the next at a rate corresponding with the movement of the can bodies along the horn. Upon reaching the last burner the working flame next reappears at the first burner and again follows the advance of the bodies. The small pilot flame that is maintained at all times does not produce sufficient heat to damage the bodies passing thereunder.

In the above described construction there is also provided a modified form of valve for controlling the flow of solder from well 25. Instead of a rotary valve such as that shown at 30 in Figs. 2 and 3, a plug 145 is provided, this plug being mounted on an arm 146 which is pivoted at 147. A cam follower or roller 148 carried by said arm bears against a revolving cam 149 which is driven from the main drive shaft 38 by a drive which may be identical with that provided for the rotary valve 30 in the embodiment first described. The working sector 150 of cam 149 results in an actuation of valve 145, such that the latter performs precisely the same function as the rotary valve 30 of the first described embodiment. The angular width of the working sector is related to the remaining or idle arc of the cam in substantially the ratio of the length of the gap between successive can bodies to the can body length. The cam makes one revolution during the period required for the passage of a body and the gap between it and the next succeeding body, and is timed so that the working sector 150 will move the valve plug 145 upwardly into contact with the port 26 at the instant that such port is uncovered. Thereafter the plug is held in contact with the said port during substantially the entire period required for the next succeeding can body to arrive in position to receive solder from the said port. Thereupon the cam follower drops to the idle arc 149, in which position the valve plug 145 is lowered sufficiently to avoid engagement with the exterior of the advancing can body, a spring 151 being provided to insure the downward movement of the valve plug. It will be understood that the modified form of valve above described may be substituted for the rotary valve in the embodiment illustrated in Figs. 1–7, inclusive, and the rotary valve of the latter embodiment may be employed in conjunction with the flame-controlling mechanism described, for example, in connection with Figs. 8 and 9, the present invention not being limited to specific combinations of the particular forms of solder valve and heat-controlling devices which are herein set forth as illustrative of constructions whereby the internal soldering operation is performed in accordance with the present invention.

In Fig. 12 there is shown a further modification wherein the burners which heat the internal solder-applying element 20 are rotatably mounted, said burners being driven at such sped as to direct their flame always through the gaps between the advancing can bodies. In this figure only a fragment of the horn 2 is shown, and the valve for controlling the flow of solder from the internal solder-applying element 20 is omitted, it being understood that any suitable form of valve may be employed, such, for example, as those herein previously described. The six burners 160 extend radially at uniform intervals from a rotatable casing 161. This casing is driven by a chain and sprocket drive 162 at such speed that the movement of the burners corresponds with the linear advance of the bodies along the horn. The casing 161 is mounted upon a stationary head 163 about which it freely revolves. Gas is centrally supplied to the stationary head through a pipe 164. The port 165 connects the interior of the head with a chamber 166 formed in the outer cylindrical surface thereof. As the casing 161 revolves, the burners 160 are progressively brought into communication with chamber 166 and receive gas therefrom to produce the required working flame for heating the internal solder-applying element 20. The angular width of chamber 166 is such that gas will be supplied to produce a working flame at each burner during the period that the flame of such burner may effectively be directed upon the element 20. Thereafter each burner receives a small supply of gas during the remainder of its rotation from a small annular groove 167 formed in the working face of head 163. This groove communicates directly with chamber 166 and permits a sufficient flow of gas to the burners to maintain a small pilot flame in each during the period that they are not in direct communication with the chamber 166. It will be understood that the above described automatic valve arrangement for controlling the flow of gas to the burners is merely provided to economize fuel. The movement of the burners is such that even though full working flame were maintained throughout their rotation, no damage would be done to the exterior of the can bodies passing thereunder inasmuch as each burner moves so as to direct its flame toward the gaps between successive bodies.

The operation of the constructions hereinbefore described has been fully set forth in connection with their detailed description. In the preferred embodiment shown in Figs. 1 to 7, inclusive, the operation may be briefly summarized as follows:

The can bodies C are delivered to the solder horn 2 with their side seams interlocked and ready to be soldered. The bodies are advanced at regular intervals along the solder horn where they are successively engaged by the internal solder-applying element 20. This element is maintained at suitable operating temperature so that solder contained within well 25 flows freely to the body seams as the latter advance beneath the solder port 26 in the said solder-applying element. A valve 30 cooperating with said port operates to check the flow of solder therefrom during the intervals between the departure of one can body and the arrival of the next at the solder port. The solder-applying element 20 may receive heat from externally arranged burners 101 through the gaps between the advancing bodies, baffle plates 103 moving with each of the bodies protecting their exteriors from the action of the burners during the transit of the bodies thereunder. Solder is supplied to well 25 at a predetermined rate by means of automatic chopper mechanism 40 which severs predetermined lengths of solder from a strip and periodically drops such pieces into the solder well, the action being timed so that the severed pieces fall between the advancing bodies. The quantity of solder thus delivered is regulated by an adjustable pin 88, the position of which determines the effective working stroke of feed block 73 which intermittently advances the solder strip to the chopper 46. In the modification shown in Figs. 8 and 9, a vertically reciprocating solder valve 145 performs the same function as the rotary valve 30 in the preferred embodiment, the motion of the reciprocating valve being controlled by cam 149 and so timed as to close the solder ports 26 when no body is present to receive the solder therefrom. In this modification the flame from the external burners 130 is controlled by a rotary valve 135, whereby as the bodies pass under said burners their flame is reduced in intensity so that the exterior of the can bodies is not subjected to excessive heat.

The modification shown in Fig. 12 accomplishes substantially the same result, the moving burners 161 being rotated so as to direct their flame upon the internal solder-applying element 20 through the gaps between the advancing bodies, the burners keeping pace with such advance so that their flame is never directed sufficiently close to the bodies to do any damage.

In the modification shown in Fig. 10, a rotary baffle disk 111 is substituted for the baffle plates 103 of the first described embodiment. The baffle disk 111 rotates at such speed that its wings 113 intercept the flame from burners 110 during the periods required for the passage of the successive can bodies thereunder. A similar result is had in the modification shown in Fig. 11, wherein a reciprocating baffle plate 121 is provided, the latter being timed to intercept the flame from burner 120 at the required intervals whereby to protect the successive bodies from the action of said flame.

In the appended claims the expressions "solder-applying means" or "solder-applying element" are to be understood to include any suitable form or equivalent of the commonly known "soldering iron" having the function of maintaining solder at such working temperature that it will flow into the seam. Such soldering irons are of various forms, either solid or hollow, and may consist of a single integral member or of a plurality of separate members which are successively engaged by the advancing can bodies.

While various forms of my invention have been hereinbefore described and illustrated, it will be understood that the invention is not limited thereto, but may be otherwise variously modified and embodied without departing from the spirit thereof, as set forth in the following claims.

What I claim is:

1. Apparatus for soldering tubular can bodies or the like, comprising internal solder applying means adapted to flow molten solder along the inside seam of the bodies, mechanical body-feeding means adapted to advance a line of bodies in spaced relationship along said solder-applying means, externally disposed heat-generating means adapted to direct heat upon the said solder-applying means through the gap between successive can bodies, and automatic control means for said heat-generating means, said control means acting in timed relationship with said body-feeding means and being operative to advance the zone of generated heat in the general direction of the advancing movement of the can bodies.

2. Apparatus for soldering tubular can bodies or the like, comprising internal solder applying means adapted to flow molten solder along the inside seam of the bodies, mechanical body-feeding means adapted to advance a line of bodies in spaced relationship along said solder applying means, external flame projecting means adapted to move its flame progressively along the said internal solder applying means through the gap between successive bodies, and automatic control means for said flame-projecting means, said control means acting in timed relation with the said body-feeding means to regulate the advancing movement of the said flame whereby to prevent the application of excessive heat to the exterior of the bodies during their passage along the internal solder applying means.

3. The apparatus according to claim 1, further characterized in that the said heat generating means comprises a plurality of burners arranged along the line of body feed and adapted to project flame through the gap between successive bodies and the said automatic control means further comprising automatic valve mechanism adapted to periodically decrease the flow of fuel to each burner as a body comes within the zone of action of the flame thereof and to again restore the normal flow of fuel to such burner as the body leaves the said zone of flame action.

4. Apparatus for soldering tubular can bodies or the like, comprising internal solder-applying means adapted to flow molten solder along the inside seam of the bodies, mechanical body-feeding means adapted to advance a line of bodies in spaced relationship along said solder-applying means, a movable burner adapted to heat the said solder-applying means through the gap between successive can bodies, and burner actuating means adapted to move said burner so that the flame thereof will advance along said solder-applying means in timed relationship with the advance of the can bodies whereby to heat the said solder-applying means for a materially longer period than would otherwise be permitted by the passage of said gap between successive bodies past a burner of similar capacity but having no movement to advance the flame along the line of body feed.

5. The apparatus according to claim 4, further characterized in that the said burner is pivotally mounted to rotate about an axis which is other than parallel to the line of advance of the can bodies.

6. The apparatus according to claim 4, further characterized in that the said burner-actuating means is adapted to move the burner so that its flame will successively repeat a predetermined heating movement along the said internal solder-applying means, there being further provided automatic valve means adapted to reduce the fuel consumption of said burner during the intervals between its said successive heating movements.

7. Apparatus for internally soldering can bodies or the like, comprising a body feed adapted to advance a succession of bodies endwise in spaced relationship, a solder well for holding molten solder located within the fed can bodies, heating means for maintaining the solder therein molten, solder feeding means for automatically supplying solder to the well to maintain a definite pool therein, solder applying means for conducting molten solder from said well to the successive seams, and valve means located externally to the bodies adapted to stop the flow of solder to the body seams coincidently with the passage of gaps between successive bodies.

8. Apparatus for internally soldering can bodies or the like, comprising a body feed adapted to advance a succession of bodies, an internally disposed solder applying element adapted to flow molten solder along a body seam during the passage of each body thereover, a well adapted to supply solder to said solder-applying element, a port in said element through which the solder flows from said well to the body surface, and an automatically actuated valve member for said port adapted in one position to extend inwardly through the gap between successive bodies to close said port and in another position to be withdrawn from said gap whereby to open said port and permit the passage of the body wall between the said valve member and said port.

9. Apparatus according to claim 8, further characterized in that gauging means are provided to maintain a small and substantially uniform separation between the port outlet and the moving body surface receiving the solder therefrom.

10. Apparatus according to claim 8, further characterized in that an internal support is provided, the bodies sliding along said support and being guided thereby, the said solder applying element being movable relative to said support and yieldingly urged against an inner body surface, when the latter moves beneath said element, and against the said valve member when the latter moves into engagement with said element.

11. Apparatus according to claim 8, further characterized in that an internal support is provided, the bodies sliding along said support and being guided thereby, the said solder applying element being movable relative to said support and yieldingly bearing against an inner body surface during the passage of such surface thereunder and against the said valve member when the latter is moved into engagement with said element, the said element being formed so that in yieldingly engaging the body, the solder port in said element is maintained at a sufficient distance from the body surface to permit the required flow of solder thereto.

12. Apparatus for internally soldering can bodies or the like, comprising a body feed adapted to advance a succession of bodies endwise in spaced relationship, internally disposed solder retaining means adapted to flow molten solder along a body seam, automatic solder feeding means acting in timed relationship with the body feed to feed solder to said retaining means and maintain therein a pool of molten solder, and valve mechanism acting in timed relation with said body feed adapted to interrupt the flow of solder coincident with the passage of gaps between the successively fed bodies.

13. Apparatus according to claim 12, further characterized in that the said solder feeding means comprises mechanism for advancing a strip of solder, and a cutter cooperating therewith to periodically cut a piece of predetermined length from the end of said strip, the solder feeding means being arranged so that the severed piece of solder falls between successive bodies and is received by the said internal solder retaining means where the solder is melted and transferred to the seam within the body.

14. Apparatus for internally soldering can bodies or the like, comprising a body feed adapted to advance a succession of bodies endwise and in spaced relationship, an internally disposed solder well past which said bodies are fed, an automatic solder feed delivering solder to said well heating means for keeping the pool of solder in said well molten, means adapted to convey molten solder from said well to the body seam, and control means acting in timed relation with said body feed and adapted to periodically check the delivery of solder from said well whereby to minimize the loss of solder that would otherwise occur during the interval between the passage of successive bodies.

15. Apparatus for internally soldering can bodies or the like, comprising a body feed adapted to advance a succession of bodies endwise and in spaced relationship, an internally disposed solder-well over which the bodies are fed, a port through which molten solder flows from said well to the body seam during the passage of each body, a valve member movable below said port to permit the passage of the body wall between the said port and valve member, valve actuating means operating in timed relationship with said body feed and adapted to close said port during the interval between the departure of one body and the arrival of the succeeding body at said port, and automatic solder-feeding means adapted to maintain a reserve supply of solder within said internally disposed solder well.

16. Apparatus according to claim 15, further characterized in that the said valve comprises a rotatable element pivoted outside the feed line of the bodies and having an arcuate working surface adapted to project within said feed line and slidingly engage the said port, the movement of said element being timed so that the said working surface closes the port during the interval between successive bodies and rotates free of said port and out of the line of feed upon the arrival of a body at said port.

17. Apparatus according to claim 15, further characterized in that the said valve actuating means is exteriorly disposed, the said valve being periodically moved into operative engagement with the solder port through the gaps between successive bodies, the element in which the port is formed being yieldingly mounted whereby when the valve is moved into engagement therewith the port will afford a yielding seat for the said valve.

18. Apparatus for soldering tubular can bodies or the like, comprising internal solder-applying means adapted to deposit molten solder along the inside seam of the bodies, mechanical body-feeding means adapted to advance a line of bodies in spaced relationship along said solder-applying means, automatic solder feeding means adapted to deliver solder to the said solder-applying means in timed relationship with the advance of the said bodies, and automatically controlled, externally disposed burner means movable to direct a localized heating effect progressively along the said internal solder-applying means through the gaps between successive can bodies, said automatically controlled burner means acting in timed relationship with said body-feeding means whereby to heat successive portions of the internal solder-applying means without application of excessive heat to the exterior surface of the moving bodies.

19. Apparatus for soldering tubular can bodies or the like, comprising an internal solder-applying element adapted to deposit molten solder along the inside seam of the bodies, a solder wall within said element, mechanical body-feeding means adapted to advance a line of bodies in spaced relationship along said solder-applying element, solder feeding means acting in timed relationship with the said body feeding means and adapted to deliver measured quantities of solder to the said solder well, a valve acting in timed relation with said body feed and controlling the flow of solder from said well to the working surface of the said solder-applying element, an external heater adapted to heat the said element through the gaps between successive can bodies, and control means for said external heater, said control means acting in timed relationship with the said body feeding means whereby to protect the advancing bodies against excessive heating.

PETER KRUSE.